(12) United States Patent
Cannon et al.

(10) Patent No.: US 7,219,337 B2
(45) Date of Patent: May 15, 2007

(54) DIRECT INSTRUCTIONS RENDERING EMULATION COMPUTER TECHNIQUE

(75) Inventors: William J. Cannon, Centerville, OH (US); Eric W. Zwirner, Dayton, OH (US); Timothy R. Hoerig, Beavercreek, OH (US); Paul D. Ward, Centerville, OH (US)

(73) Assignee: Northrop Grumman Corporation, Los Angeles, CA (US)

( * ) Notice: Subject to any disclaimer, the term of this patent is extended or adjusted under 35 U.S.C. 154(b) by 571 days.

(21) Appl. No.: 10/382,598

(22) Filed: Mar. 6, 2003

(65) Prior Publication Data

US 2004/0177346 A1     Sep. 9, 2004

(51) Int. Cl.
*G06F 9/45* (2006.01)
(52) U.S. Cl. ..................... 717/138; 717/151
(58) Field of Classification Search ........ 717/127–244; 707/3–206; 712/244
See application file for complete search history.

(56) References Cited

U.S. PATENT DOCUMENTS

| | | | |
|---|---|---|---|
| 4,025,901 A * | 5/1977 | Bachman et al. ............. | 707/3 |
| 4,432,051 A * | 2/1984 | Bogaert et al. ............ | 717/127 |
| 6,041,402 A | 3/2000 | Cannon et al. | |
| 6,202,145 B1 * | 3/2001 | Barnes et al. ............... | 712/244 |
| 6,212,614 B1 | 4/2001 | Hoerig et al. | |
| 6,272,453 B1 | 8/2001 | Hoerig et al. | |
| 2004/0111447 A1 * | 6/2004 | Garthwaite ................. | 707/206 |

OTHER PUBLICATIONS

Lang et al: "Threaded Code Interpreter for Object Code", IP. Com Journal, Mar. 1, 1986, XP013049537 issn: 1533-0001, IP Com Inc., West Henrietta, NY, US.
May, C.: "Mimic: A Fast System/970 Simulator", Proceedings of the Object Oriented Programming Systems Languages and Applications Conference. (OOPSLA) Orlando.
Oct. 4-8, 1987, Special Issue of Sigplan Notices, vol. 22 No. 12 Dec. 1987, vol. Conf 2, Jun. 24, 1987 pp. 1-13, XP002009322, Reading, ACM, US.
"System/370 Emulator Assist Processor for a Reduced Instruction Set Computer", IBM Technical Disclosure Bulletin, Mar. 1, 1988, vol. 30, No. 10, pp. 308-309.
XP00023134, Issn: 0018-8689, New York, US.

* cited by examiner

*Primary Examiner*—Kakali Chaki
*Assistant Examiner*—Mark P. Francis
(74) *Attorney, Agent, or Firm*—John S. Paniaguas; Katten Muchin Rosenman LLP

(57) ABSTRACT

A method and system for emulating instructions of legacy microprocessors which execute a compiled high-ordered language, such as C/C++, in which the compiled code is structured such that data and instructions segments are segregated. In order to improve the real-time performance of the system, legacy instructions are directly mapped to equivalent instructions of the host processor where possible. Additional techniques may optionally be employed to further increase the real-time performance of the system. By utilizing the direct mapping of the legacy instructions to host instructions, the emulation system in accordance with the present invention provides increased real-time performance for relatively modern RISC microprocessors.

6 Claims, 11 Drawing Sheets

MIPS Instruction

| BEQ rs, rt, offset | Branch if (rs = rt) to (PC + offset) |

PowerPC Handler

| Legacy binary | Binary of legacy instruction |
| Next pointer | Pointer to next of this type |
| cmpw crT, rA, rB | Compare rA to rB, store result in crT |
| beq crT, offset | Branch if crT indicates equality to PC + offset |
| blr | Branch back to instruction stream (if beq not satisfied) |

MIPS Instruction

| SLT rd, rs, rt | Set rd to 1 if rs < rt, else set rd to 0 |

PowerPC Handler

| Legacy binary | Binary of legacy instruction |
|---|---|
| Next pointer | Pointer to next of this type |
| stw rscratch, 0 (sp) | Store scratch register to stack |
| cmpw crT, rA, rB | Compare the two values |
| mfcr rscratch | Get compare result into scratch register |
| rlwinm rS, rscratch, 1, 30, 31 | Rotate appropriate bit into rd (PowerPC rs) |
| lwz rscratch, 0 (sp) | Restore scratch register from stack |
| blr | Branch back to instruction stream |

Figure 11

MIPS Instruction

| MTC1 rt, fs | Move general register rt to floating point register fs |

PowerPC Handler

| Legacy Binary | Binary of legacy instruction |
|---|---|
| Next Pointer | Pointer to next of this type |
| stw rscratch, 0 (sp) | Store scratch register to stack |
| lui rscratch, buf@h | Load upper 16-bits of memory buffer address into rscratch |
| ori rscratch, rscratch, buf@l | Or in the lower 16-bits of memory buffer address |
| stw rS, 0 (rscratch) | Store rt (PowerPC rS) to memory buffer |
| lfs fT, 0 (scratch) | Load fs (PowerPC fT) from memory buffer |
| lwz rscratch, 0 (sp) | Restore scratch register from stack |
| blr | Branch back to instruction stream |

Figure 12

MIPS I-Type (Immediate)
Integer Instruction Format

opcode - 6-bit operation code
rs - 5-bit source register number
rt - 5-bit target (source or destination) or branch condition register
immediate - 16-bit immediate value used for branch displacement or address indexing

Figure 16

MIPS R-Type (Register)
Integer Instruction Format

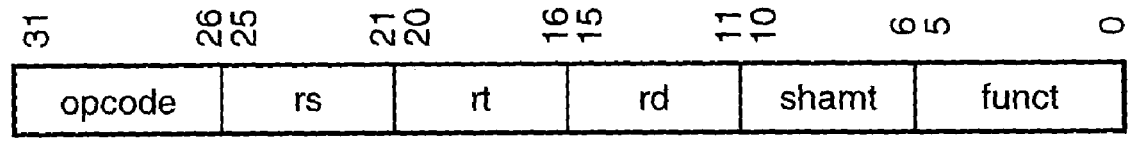

opcode - 6-bit operation code
rs - 5-bit source register number
rt - 5-bit target (source or destination) or branch condition register
rd - 5-bit destination register number
shamt - 5-bit shift amount (when applicable)
funct - 6-bit function field

Figure 17

MIPS J-Type (Jump)
Integer Instruction Format

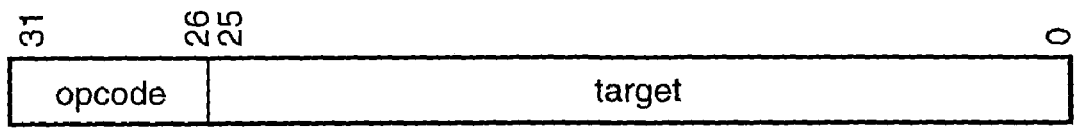

opcode   - 6-bit operation code
target   - 26-bit target address

Figure 18

MIPS I-Type (Immediate)
Floating-Point Instruction Format

opcode   - 6-bit operation code
base     - 5-bit base register number
ft       - 5-bit source register number
offset   - 16-bit signed immediate offset value from base

Figure 19

MIPS R-Type (Register)
Floating-Point Instruction Format

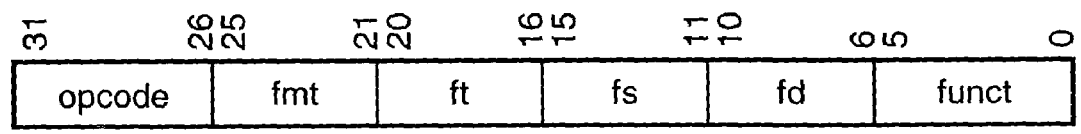

opcode   - 6-bit operation code
fmt      - 5-bit format specifier
ft       - 5-bit source register number
fs       - 5-bit source register number
fd       - 5-bit destination register number
func     - 6-bit function field

DIRECT INSTRUCTIONS RENDERING EMULATION COMPUTER TECHNIQUE

BACKGROUND OF THE INVENTION

1. Field of the Invention

The present invention relates to a method and apparatus for emulating instructions of a legacy microprocessor and, more particularly, to an emulation system for a legacy microprocessor, such as a 32-bit microprocessor, which executes a compiled higher-order language, such as C/C++, in which the compiled code is structured such that data and instruction segments are structured, for example, as in Reduced Instruction Set Computer (RISC) microprocessors, wherein the legacy instructions are directly mapped to an equivalent instruction of the host processor, where possible, to improve the real-time performance of the system.

2. Description of the Prior Art

It is known that microprocessors are configured with different instruction-set architectures (ISA). The ISA determines the instruction set for a particular microprocessor. Application programs are executed by a microprocessor, normally written in a relatively high-level language, which, in turn, are compiled into machine instructions compatible with the instruction set for a specific microprocessor.

Due to the age obsolescence of many existing microprocessors and corresponding slow speed, it is often desired to replace outdated existing microprocessors, hereinafter referred to as legacy microprocessors, with newer microprocessors, hereinafter referred to as host microprocessors. Unfortunately, depending on the particular upgrade, most times the instruction set of the host microprocessor is incompatible with the instruction set of the legacy microprocessor.

One way to solve this problem is to rewrite the existing application program taking into account the instruction set of the host microprocessor. Such a technique is relatively cumbersome and quite expensive. In order to work around instruction set incompatibilities, software systems are known for emulating instructions of legacy microprocessors. Such systems are often referred to as emulation systems. Such emulation systems are known to emulate the instruction set of the legacy microprocessor in order to enable the application programs written in terms of the instruction set for the legacy microprocessor to be executed by a newer, faster host microprocessor.

In many known emulation systems, legacy instructions are fetched by the host microprocessor, which, in turn, uses a look-up table to interpret the legacy instruction. With such emulation systems, since each legacy instruction must be interpreted, systems which incorporate cache memory are known to suffer from relatively high probability of cache misses, which decreases the overall throughput of the system.

In order to improve the throughput or speed of such emulation systems, commonly owned U.S. Pat. No. 6,041,402 discloses a direct vectored legacy instruction set emulation system. Rather than fetching legacy instructions and interpreting the instructions in software, the direct vectored legacy instruction set emulation system fetches direct vectors to software routines which emulate the legacy instructions. By fetching the direct vectors, the need for look-up tables for interpreting the legacy instructions is eliminated. Since look-up table accesses are eliminated with such a system, the probability of cache misses is greatly reduced, which, in turn, increases the throughput of the system. Unfortunately, the direct vectored legacy instruction set emulation requires too much performance overhead for relatively modern microprocessors, such as 32-bit RISC microprocessors. Thus, there is a need for an emulation system and method for emulating instructions of legacy microprocessors which provides improved real-time performance relative to known emulation systems.

SUMMARY OF THE INVENTION

Briefly, the present invention relates to a method and system for emulating instructions of legacy microprocessors which execute a compiled high-order language, such as C/C++, in which the compiled code is structured such that data and instructions segments are segregated, for example, as in reduced instruction set computer (RISC) microprocessors. In order to improve the real-time performance of the system, legacy instructions are directly mapped to equivalent instructions of the host processor, where possible. Additional techniques may optionally be employed to further increase the real-time performance of the system. When exact matches cannot be made, an unconditional branch instruction to an instruction handler is used. The instruction handler is made up of two or more host processor instructions that ultimately perform the same function as the replaced legacy instruction. For legacy instructions which cannot be emulated solely with host instructions, these instructions are emulated by instruction handlers which include several host instructions and which incorporate the use of scratch pad registers. For legacy instructions that involve architectural features of a legacy microprocessor that cannot be handled easily by the host processor's assembly language, an instruction handler is formed from a high level language, such as, C/C++ code. By utilizing the direct mapping of the legacy instructions to host instructions and one or more of the above-mentioned emulation techniques, the emulation system in accordance with the present invention provides increased real-time performance for relatively modern RISC microprocessors.

DESCRIPTION OF THE DRAWINGS

These and other advantages of the present invention will be readily understood with reference to the following specification and attached drawing wherein:

FIG. 11 is an example of an emulation of an exemplary legacy instruction fully emulated by a plurality of host instructions which requires a scratch-pad register for a MIPS SLT (set if less than) instruction to a PowerPC handler.

FIG. 12 is similar to FIG. 11, except that it illustrates the emulation of an exemplary MTC1 (move to co-processor 1) instruction.

FIGS. 16–20 illustrate the various instruction formats for a MIPS type RISC microprocessor.

DETAILED DESCRIPTION

Figure 1:
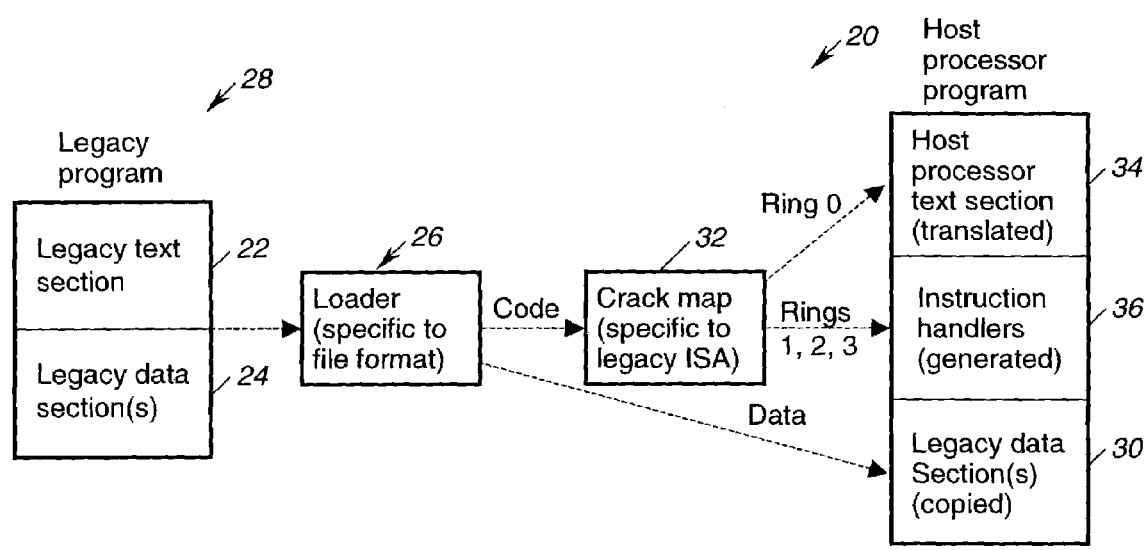
FIG. 1 is a high-level block diagram of the emulation system in accordance with the present invention.

The present invention relates to a method and apparatus for emulating instructions of a particular category legacy microprocessors which execute a compiled higher-order language, such as C/C++, Fortran, or ADA. Such compiled code is typically structured such that data and instruction segments are segregated. The compiled code also conforms to other platform specific Application Binary Interfaces (ABI) which describe things like procedure calling and linkage conventions and register usage conventions.

The present invention relates to the emulation of a 32-bit RISC microprocessor using another 32-bit RISC microprocessor. As used herein, host processor denotes the processor that executes the emulation program. The term legacy processor is used to identify the processor being emulated.

The emulation technique in accordance with the present invention assumes similarities between the host and legacy processors to enable the legacy instructions to be categorized into one or more of the following four categories:

Ring 0—These legacy instructions can be replaced with a single host processor instruction that performs the same function. Modifying the op code of the instruction and rearranging the instruction field is generally all that is necessary for this category.

Ring 1—This type of legacy instruction can be replaced with two or more host processor instructions that perform the same function and do not require scratch-pad registers to perform the operation.

Ring 2—These legacy instructions can be replaced with two or more host processor instructions that perform the same function but require one or more scratch-pad registers to perform the operation.

Ring 3—These legacy instructions generally relate to advanced architectural features of the legacy microprocessor and further relate to instructions that are far too complex to be implemented utilizing only the host processor assembly language. These instructions are handled almost entirely in a high-level language, such as C/C++.

In order to enable the host processor to execute programs written for the legacy processor, the legacy processor's binary instructions must be rendered into the host processor's binary instructions in one of the four categories mentioned above. There are many operations performed by all microprocessors, such as simple arithmetic (i.e., add, subtract, multiply), logical operations (i.e., logical and, or, not), and data moving (i.e., load and store). Many of these instructions are very similar and identical between different brands and/or models of RISC microprocessors and tend to appear frequently throughout many application programs. Thus, by taking advantage of the similarities of the instruction sets between the host microprocessor and the legacy microprocessor and utilizing direct mapping as set forth in the Ring 0 category, wherever possible, the real-time performance of the system will be greatly improved. When exact matches cannot be made, the legacy instruction is replaced with an unconditional branch instruction to a legacy instruction handler made up of two or more host processor instructions that ultimately perform the same function as the replaced legacy instruction, for example, for legacy instructions categorized as Ring 1 and Ring 2. The use of unconditional branches helps retain performance by taking advantage of the host microprocessor branch prediction capabilities. For advanced instructions that involve advanced features of the legacy microprocessor or cannot be easily handled with the host processor assembly language, Ring 3 category instructions are branched out to a higher-level language, such as C/C++, to handle the operation at a higher level.

In order to retain the performance advantage of Ring 0, Ring 1, and Ring 2 and because the register usage conventions differ between the legacy and host microprocessors, the legacy registers are re-mapped to the corresponding functional equivalent host register. For example, the stack pointer for a PowerPC host microprocessor is r1, while the stack pointer for a MIPS R4400 microprocessor is r29. Known emulator systems are known to keep legacy registers in memory, which require memory accesses and additional host instructions to manipulate a legacy register value, which substantially decreased the real-time performance. By re-mapping the legacy registers to the host processor registers, the real-time performance is enhanced relative to known emulation systems.

The invention is described in terms of a 32-bit R4400 RISC microprocessor by MIPS Technologies, Inc. (http://www.mips.com) as a legacy processor and a PowerPC host processor (http://www.motorola.com/powerpc). However, as mentioned above, the principles of the present invention are applicable to any compatible microprocessors in which some of the legacy processor instructions can be directly mapped to a host processor instruction. It is known that the number of 1:1 matches between instructions can be relatively high for compatible host/legacy processor combinations.

System Overview

A high-level block diagram of the emulation system and method in accordance with the present invention is illustrated in FIG. 1 and generally identified with the reference numeral 20. As mentioned above, the emulation system and method in accordance with the present invention is amenable for use with legacy microprocessors in which the instructions and data are segregated, as indicated by the boxes 22 and 24. A file loader 26 locates the legacy program, generally identified with the reference numeral 28. File loaders are well known with the art. The file loader 26 reads the legacy file format and fetches the legacy binary files. As shown in FIG. 1, the file loader 26 fetches both the legacy instructions 22 as well as the legacy data files 24. These legacy instruction and data files 22 and 24 may be contained on a disk, a read-only memory, or fetched over a network. If the legacy data 24 is static, it is simply copied to a legacy data memory space 30 associated with the host microprocessor program. Alternatively, the legacy data may be created and initialized for data sections that are created dynamically as the program runs.

The legacy instructions 22 are provided by the file loader 26 to a crack map object 32. The crack map object 32 is specific to the legacy and host instruction set architectures, as will be discussed in more detail below. As will also be discussed in more detail below, the crack map object 32 analyzes each legacy instruction 22 and categorizes the instruction according to the four exemplary categories discussed above (i.e., Ring 0, Ring 1, Ring 2 and Ring 3). As shown in FIG. 1, Ring 1–3 instructions are placed in separate handler memory space from the Ring 0 memory space. The Ring 0 instructions are directly mapped by the crack map object 32 to the host processor memory space 34. All other instructions are mapped to the instruction handlers 36.

Crack Map Object

The crack map object 32 converts each legacy binary instruction received from the file loader 26 into one or more host processor instructions. As mentioned above, the crack map object 32 described and illustrated herein is for emulating instructions of the legacy MIPS R4400 RISC microprocessor by way of a PowerPC G3/G4 processor.

Figure 2:
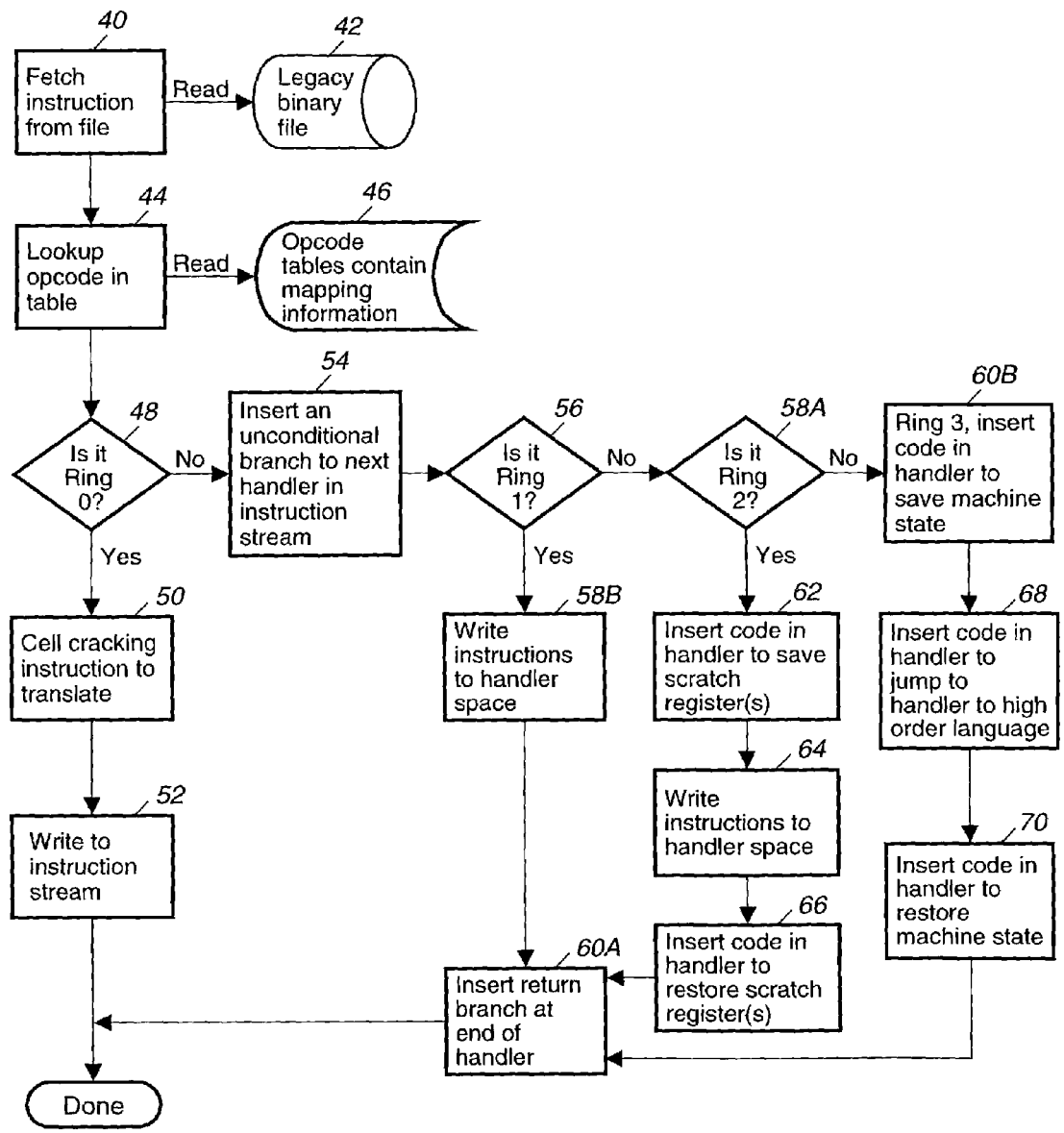
FIG. 2 is a software flow diagram of an instruction cracking process used in accordance with the present invention.

Referring to FIG. 2, the crack map object 32 fetches and reads each legacy instruction 22 in steps 40 and 42. Each legacy instruction is then decoded based on its op-code in steps 44 and 46. More particularly, with reference to Tables 1 and 2 below, each legacy instruction is listed in a look-up table along with its legacy op-code along with other data fields, as described below. These look up tables, as will be discussed in more detail below, include the Ring category for each legacy instruction 22. Accordingly, the crack map object 32 checks in step 48 to determine whether the instruction falls into the Ring 0 category. If so, the crack map object 32 directly maps the legacy instruction 22 to a host instruction by translating the op-codes, as will be discussed in more detail below, in step 50. The translated host instruction is then written to the application program instruction stream in step 52.

If the legacy instruction 22 is not a Ring 0 category, an unconditional branch instruction to the next handler in the instruction stream is inserted in the instruction stream in step 54. The system then checks in steps 56, 58 and 60 to determine whether the legacy instruction falls into a Ring 1 category, Ring 2 category and Ring 3 category.

If the legacy instruction 22 falls into a Ring 1 category, as determined in 56, instructions to the instruction handler's 36 (FIG. 1) are written in step 58B and a return branch instruction is inserted at the end of the instruction handler 36 in step 60A. Should the instruction be determined to be a Ring 2 category instruction, as determined in step 58A, the crack map object 32 inserts code to save data from the scratch pad registers and subsequently writes instructions to the instruction handler space 36 (FIG. 1) in step 64.

As mentioned above, Ring 2 category instructions require a plurality of host processor instructions along with scratch pad registers in order to provide an equivalent function to the legacy instruction. Once the instruction is emulated, the scratch pad registers associated with the Ring 2 instructions are restored in step 66. The system then returns to step 60A and inserts a branch at the end of the handler to return to the instruction stream.

If it is determined that the instruction is a Ring 3 category instruction, instruction code is inserted in the instruction handler 36 to save the machine state in step 60B. Subsequently in step 68, the instruction handler jumps to a higher order language program, for example C/C++, which provides an equivalent function to the legacy instruction. The higher order language by way of a compiler handles the return back to the instruction handler 36 which returns to step 70 where the machine state is restored and the system returns to the main instruction screen by inserting a return branch instruction at the end of the handler.

Instruction Spacing and Branch Folding

Figure 14:
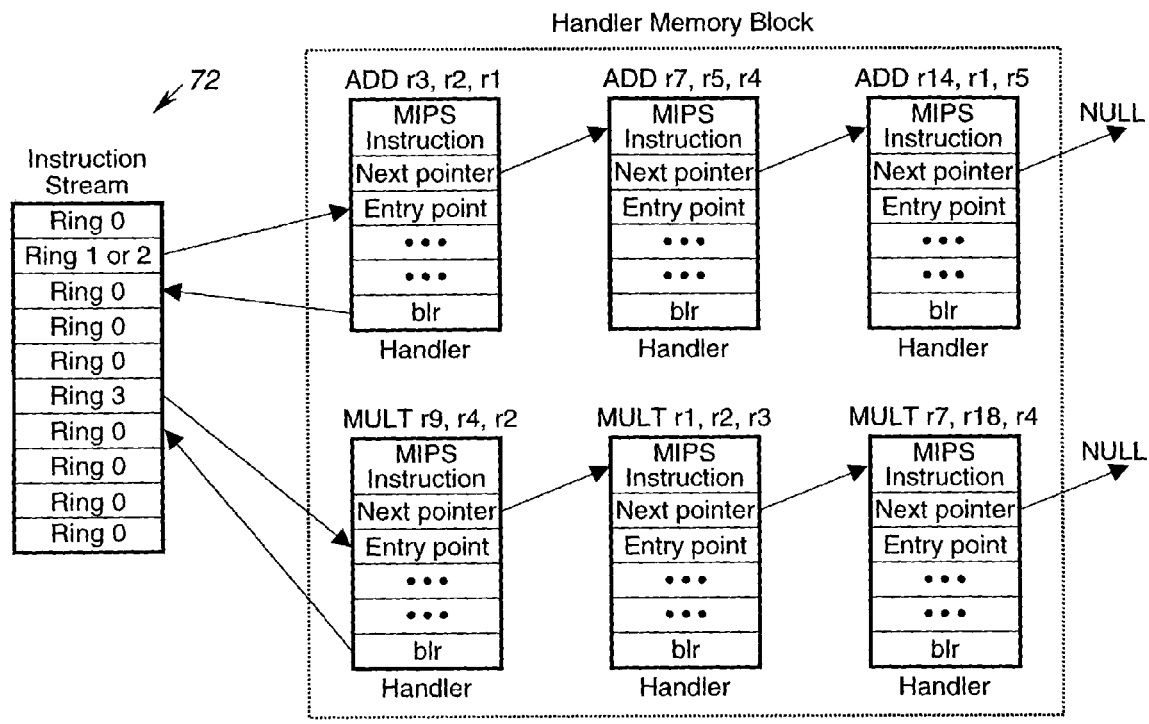
FIG. 14 illustrates an instruction stream containing various legacy instructions and the corresponding handler memory space.
Figure 15:
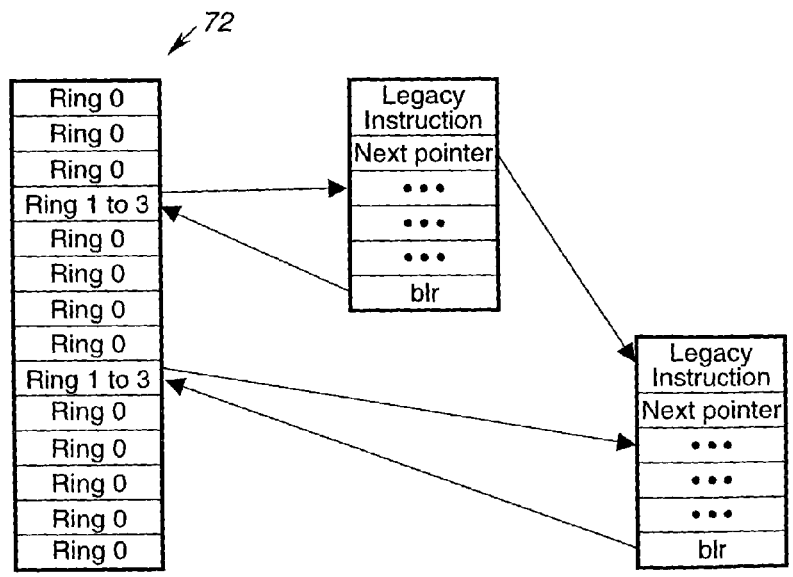
FIG. 15 illustrates execution of the emulation program in accordance with the present invention.

As shown best in FIGS. 14 and 15, the host processor program is shown as an instruction stream, generally identified with the reference number 72, which includes Ring 0 type instructions and unconditional branches to instruction handlers 36 (FIG. 1). This configuration of placing Ring category 1–3 instructions in separate handlers space 36 from the Ring 0 space 34 and using the unconditional branches to branch to the Ring 1–3 instruction handlers space 36 (FIG. 1) is used to maintain distance between the instructions. More particularly, every program is anticipated to contain jump and/or branch instructions. If the spacing between instructions is not maintained, jumps and branches may end up at the wrong location, since many instructions operate in a relative fashion, jumping forward or backward a given distance from the current location rather than using an absolute destination address. Thus, when a 1:1 match cannot be made, a single unconditional branch is used in place of the legacy instruction as shown in FIGS. 14 and 15. The unconditional branch instruction vectors to the instruction handler space 36 (FIG. 1) to emulate the legacy instruction. When the handler completes its function, it returns to the instruction following the unconditional branch, as shown thus in FIGS. 14 and 15.

Figures 3, 4:
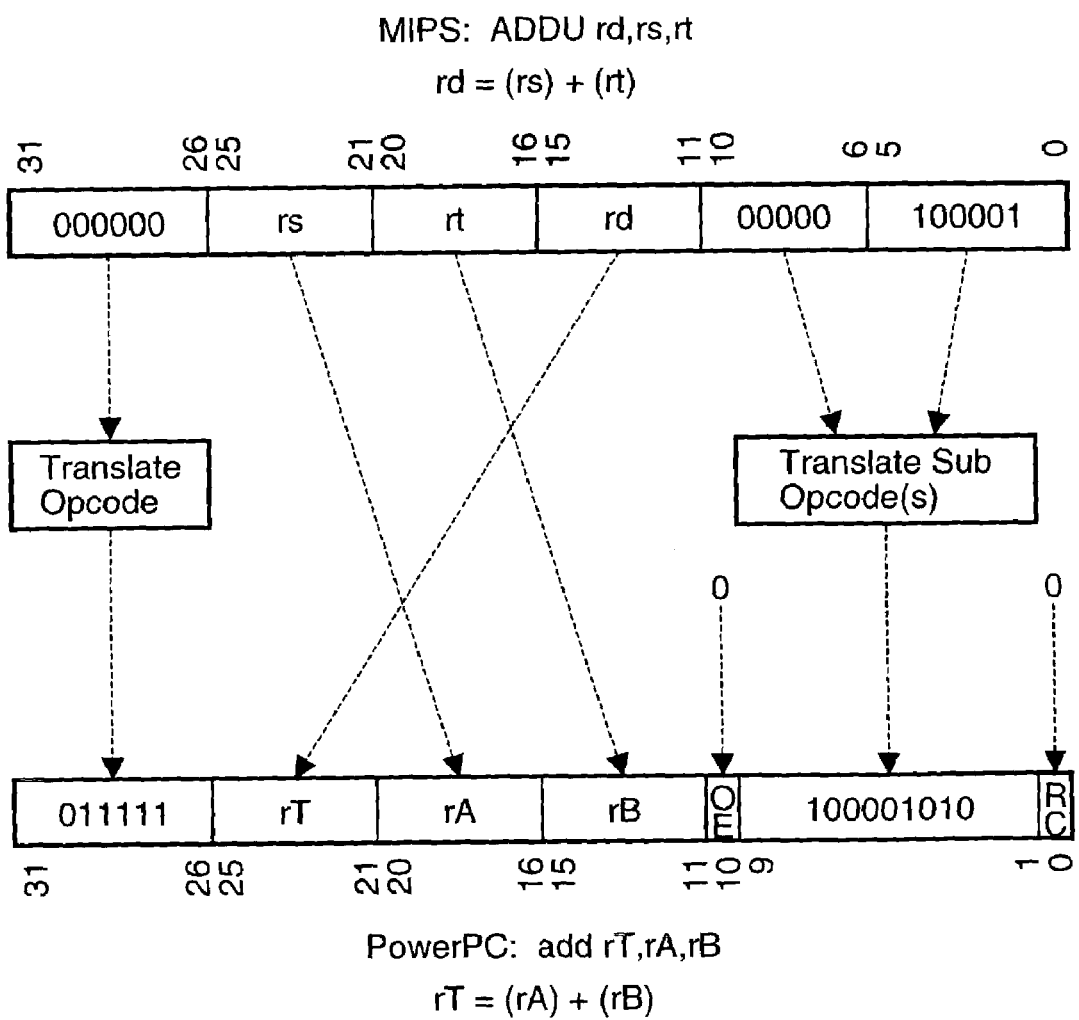
FIG. 3 is a diagram of a portion of memory illustrating memory mapping in accordance with one aspect of the invention.
FIG. 4 illustrates an exemplary example of direct mapping of the op code of an exemplary legacy ADDU (add unsigned) instruction to a host ADD instruction.

FIG. 3 illustrates an example of an conditional branch forward based upon relative addressing. More particularly, during the execution of the instruction at address 1004, the program counter points to the next instruction at address 1008. As shown in FIG. 3, the instruction BEQ is a conditional branch instruction. The conditional branch instruction, if taken, increments the current address by eight (8) to arrive at a destination address of 1010. If either of the instructions at 1008 or 100C cannot be translated 1:1 and if additional code is inserted in line, a branch would vector to an incorrect destination address. If instead an unconditional branch is used to branch to an instruction handler, for example, an unconditional branch inserted into the instruction stream 72 (FIGS. 14 and 15), the distance remains the same.

This technique relies on a feature of many RISC processors called "branch folding" which allows the unconditional branches to be automatically removed from the instruction stream by the processor with little or no loss of performance. When a branch is unconditional, it must be taken. The processor simply begins pre-fetching instructions down the new path, and little or no performance penalty is associated with the branch. On the other hand conditional branches can impose significant performance penalties because instruction pre-fetching can't occur until it is known which path to take.

Register Mapping

In accordance with one aspect of the present invention, register mapping is used to prevent conflicts between the host processor and the legacy processor. For example on a MIPS R4400 microprocessor, general register 29 is the stack pointer. However on a Power PC microprocessor, the stack pointer is register 1. In order to prevent conflicts, register fields in legacy instructions are remapped to the host processor registers. In an example where legacy instructions of a MIPS R4400 microprocessor instructions are mapped to a Power PC instructions, register 29 of the legacy instructions is remapped to register 1 of the host processor and register 1 of the legacy instructions is remapped to register 29 of the host processor. This may be done by treating the legacy register numbers as an index into an array which contains the host processor number to be used for the given legacy register number.

Instruction Rendering

Figure 7:
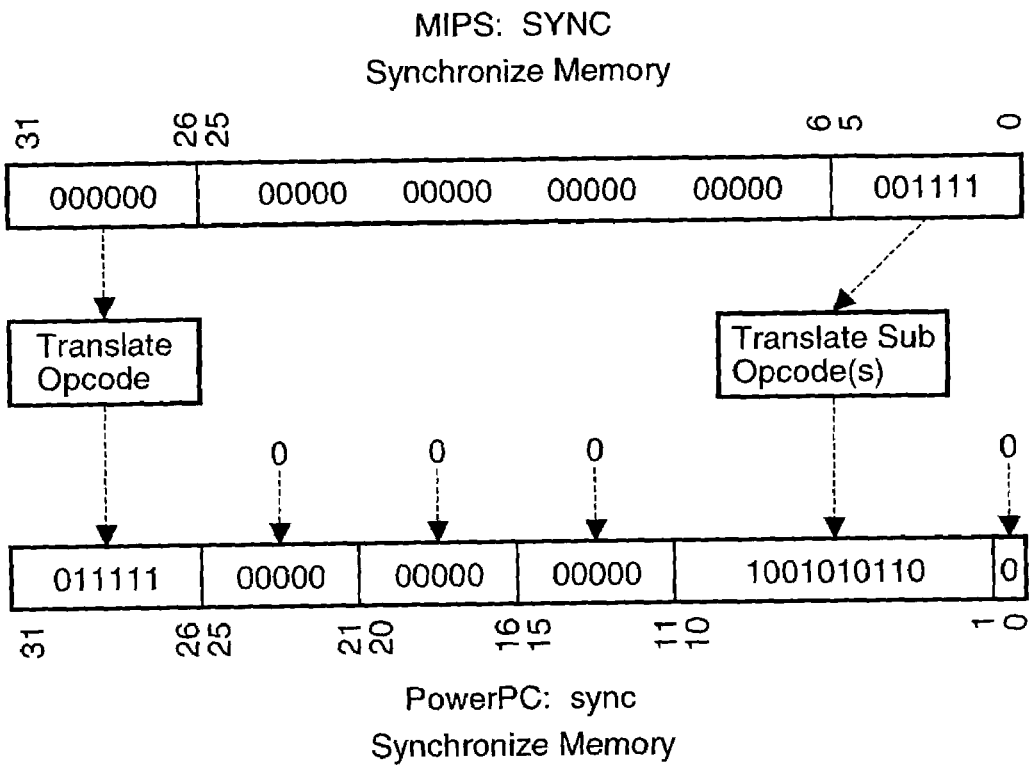
FIG. 7 is similar to FIG. 4 and illustrates the mapping of an exemplary legacy SYNC instruction to a host instruction.
Figure 8:
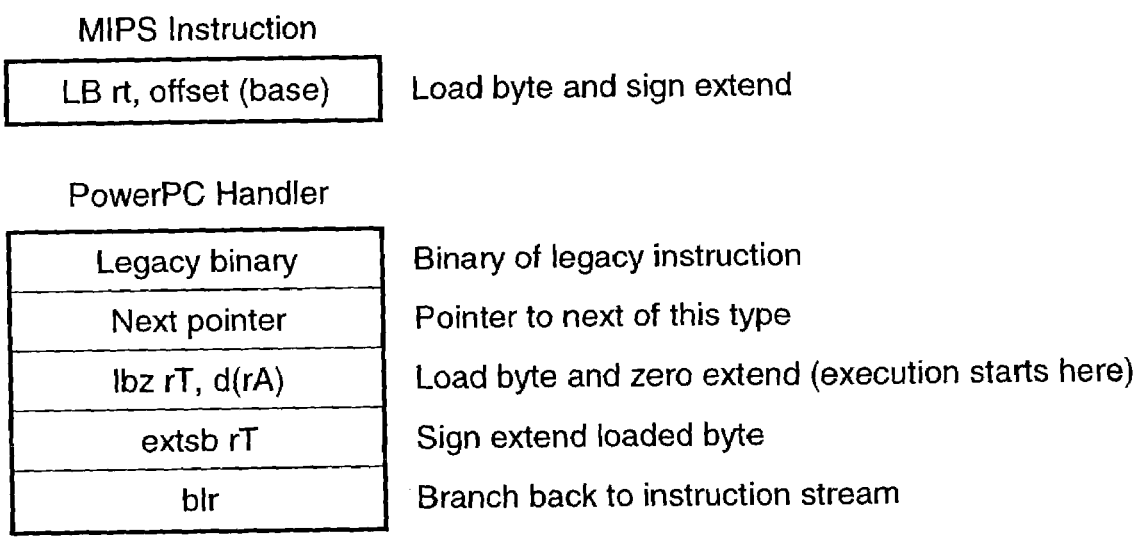
FIG. 8 illustrates an exemplary host instruction handler for an exemplary legacy LB (load byte) instruction.
Figures 9, 10:
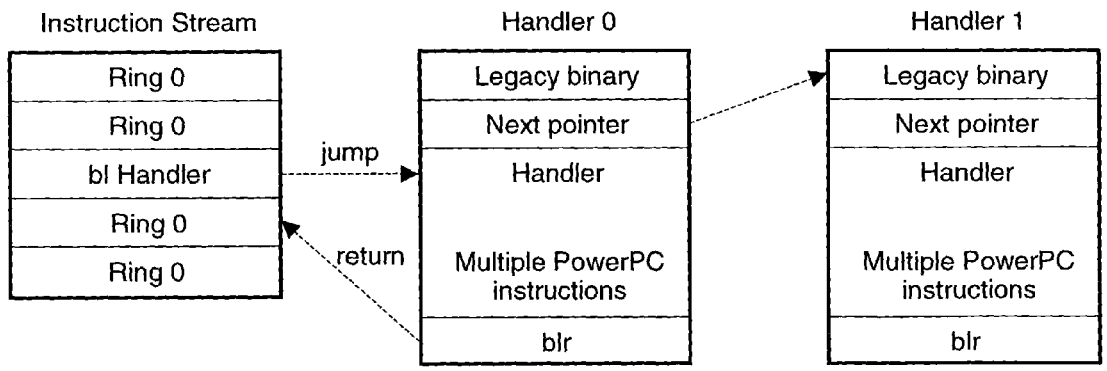
FIG. 9 is similar to FIG. 8 but for an exemplary legacy BEQ (branch if equal) instruction.
FIG. 10 illustrates an instruction stream which includes a number of direct mapped instructions, for example, as illustrated in FIGS. 4 through 7, illustrating unconditional branches to instruction handlers for legacy instructions which cannot be directly mapped to a host instruction.

As mentioned above, legacy instructions are categorized into one of four categories: Ring 0, Ring 1, Ring 2 or Ring 3. As discussed above, the object code of the Ring 0 legacy instructions are directly mapped or converted to a single host instruction which performs the same function. Examples of selected rendering of legacy instructions are described and illustrated herein. Mapping of Ring 0 instructions is illustrated in FIGS. 4–7. Examples of mapping of Ring 1 instructions are illustrated in FIGS. 8 and 9. Examples of a Ring 2 instruction mapping are illustrated in FIGS. 11 and 12 while an example of a Ring 3 instruction mapping is illustrated in FIG. 13.

Ring 0 Instructions

Ring 0 instructions are legacy processor instructions that can be replaced with a single host processor instruction. Binary reorganization (i.e. translating of the object code) of the legacy instructions is necessary most of the time even though the corresponding host processor instruction performs the same operation as the legacy processor instruction.

FIGS. 4–7 illustrate examples of conversions of several 32-bit MIPS R4400 RISC processor instructions to 32-bit Power PC RISC microprocessor equivalent instructions. In this example, the MIPS processor is the legacy processor while the Power PC is the host processor.

For Ring 0 instructions, the operation code (op code) is changed to match the appropriate instruction in the host processor. In some cases, a sub op code field must also be translated. Registers and immediate value fields are moved as necessary. In some cases, the host processor bit fields are set to an inactive state. Though not shown in the figures, legacy register mapping may also be done depending on the legacy/host processor combination.

FIG. 4 illustrates an example of a MIPS ADDU (add unsigned instruction) in its simplest binary representation. To convert the ADDU legacy instruction to an equivalent host ADD instruction, the op code and various sub op code fields as well as register fields are changed as illustrated in FIG. 4. The host instruction also has 2 additional single bit option fields (i.e., bits 0 and 10) that are not used for the legacy instruction. These fields are simply cleared.

Referring to FIG. 4, the ADDU legacy instruction (adds the values in the registers rs and rt and stores the results in a register rd). As shown, the legacy sub op code is 00000100001, which corresponds to bits 0–10 of the legacy instruction. The binary value 0000010001 corresponds to a decimal 33. The corresponding host instruction is an Add instruction.

In this case, the host instruction adds values in its registers rA and rB stores the results in a register rT. The format of the host processor instruction is slightly different from the format for the corresponding legacy instruction. In addition, the host instruction includes an RC (record condition) bit and an OE (overflow enable) bit as bits 0 and 10 of the 32 bit instruction. These options are not available for the legacy MIPS processor. As discussed above, these bits are simply zeroed out. After zeroing out bits 0 and 10, the equivalent sub op code of the host Add instruction is 100001010. Thus, in this case, the legacy op code 00000100001 is translated to 100001010 and, as mentioned above, and the registers are remapped. In particular, the legacy register rd is mapped to the host register rT while the legacy register rs is mapped to the host register rA and finally the legacy register rt is mapped to the host register rB. In addition, bits 26–31 of the legacy instruction are translated to the appropriate op code for the host instruction. As shown, the op code at bits 26–31, shown as 000000 is translated 011111.

Figure 5:
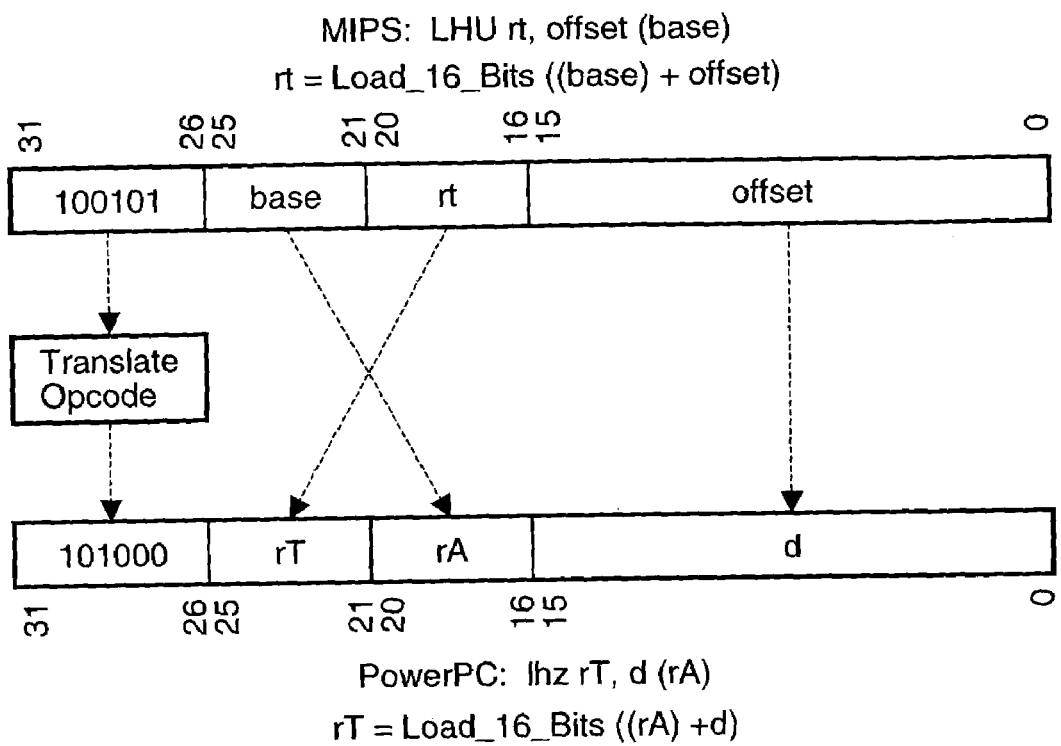
FIG. 5 is similar to FIG. 4 but illustrates the mapping of an exemplary legacy LHU (load half word unsigned) instruction to a host instruction.
Figure 6:
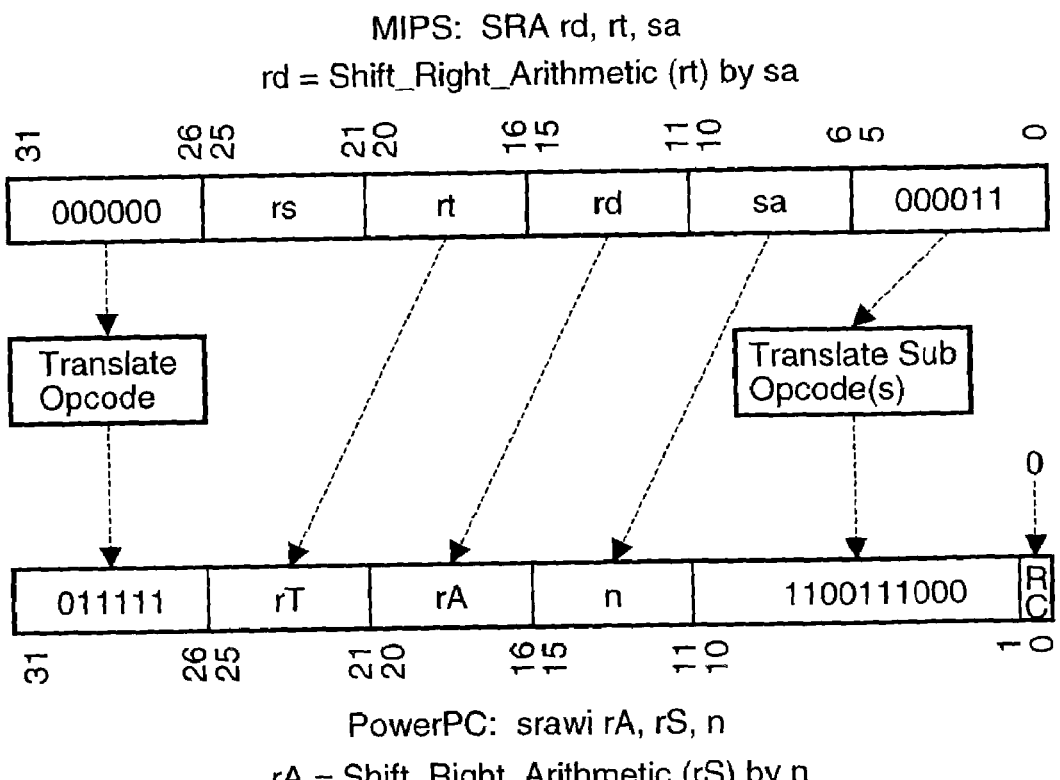
FIG. 6 is similar to FIG. 4 and illustrates the mapping of an exemplary legacy SRA (shift right algebraic) instruction to a host instruction.

FIGS. 5 and 6 illustrate other examples of direct mapping. For example, FIG. 5 illustrates direct mapping of a legacy LHU (load halfword unsigned) instruction and an SRA (shift right algebraic) instruction. In the case of the LHU instruction, immediate data is also transferred to the host processor instruction. The SRA instruction contains an immediate 5 bit shift count field. Finally FIG. 7 illustrates a legacy Sync instruction which has no argument. The corresponding Sync instruction similarly has no arguments. In this case the op code and sub op code are translated as illustrated in FIG. 7.

Ring 1 Instructions

As mentioned above, Ring 1 category legacy instructions cannot be mapped directly to a single host processor instruction. Therefore, an unconditional branch instruction is inserted into the instruction stream 72 (FIGS. 14, 15) as discussed above. The branch vectors execution to an instruction handler that uses multiple host processor instructions to emulate the behavior of the emulated legacy instruction. Ring 1 instructions allow for a simple enough emulation that additional scratch registers are not required.

FIG. 8 illustrates an assembly language mnemonic for a legacy LB (load byte) instruction and a host instruction handler for the LB legacy instruction. The legacy LB instruction is categorized as a Ring 1 instruction because the legacy instruction also performs a sign extension which extends the sign bit in the destination register based on the sign of the byte loaded. An additional host processor instruction is required to perform the sign extension. More particularly, as illustrated in FIG. 8, five words are required to handle this instruction. The first word is the exact legacy binary instruction. The next word is a pointer to another handler for the same instruction with different operands. This is done to allow reusing a handler that has already been created. The singly linked list provides a mechanism for searching for a match. The third word starts the host processor handler of the legacy instruction. Any number of host processor instructions may be present. Finally, a host processor sub routine return instruction is inserted to return to the main instruction stream.

FIG. 9 illustrates a legacy BEQ (branch if equal instruction) and a host instruction handler for emulating this instruction. In this case the BEQ legacy instruction is categorized as a Ring 1 instruction because the legacy BEQ instruction performs a comparison and branch all in one instruction. The host processor instructions do not allow for comparison branching in one instruction. Rather, the instructions for the host processor require that the compare must be done separately and the results stored in a condition code register. Then the conditional branch uses the stored condition code when deciding whether to branch.

In the case of the legacy target, the host handler may also incorporate the legacy instruction immediately following the branch of equal instruction since the legacy processor may execute it while calculating the destination address. The handler can accommodate this as well, although not shown in the figure. More particularly with reference to FIG. 10, a Ring 1 is shown in an instruction stream with several Ring 0 instructions. Whenever a Ring 1 instruction is executed, an unconditional branch and link instruction is used to vector execution to an instruction handler starting at the instruction following the two word header. As shown in FIG. 10, at the end of the instruction handler, execution returns to the instruction stream and specifically to the link address immediately following the branch.

Ring 2 Instruction

Ring 2 instructions are similar to Ring 1 instructions except that one or more scratch registers are needed to perform the operation. This requires saving out one or more of the host processor registers and then restoring them before returning to the legacy instruction screen.

FIG. 11 is an example of a Ring 2 instruction. In particular, FIG. 11 illustrates a legacy SLT (set if less than instruction) and a host instruction handler for handling this instruction. The legacy instruction performs a compare and stores the zero for inequality and a zero for equality into a designated register. In this case the host processor, a Power PC processor, does not have a corresponding instruction. Thus, the host processor instead performs a compare and then extracts the results of the compare from a condition code register. That value must then be rotated into the correct position. These operations require a scratch register to work so one is allocated, saved out and restored when the handler is complete.

FIG. 12 illustrates another example of a legacy MTC1 instruction along with its corresponding host processor instruction handler. The MTC1 instruction is a move to co-processor 1 instruction which moves a value from a general purpose register into a floating-point register which is the legacy processor-coprocessor 1. In the case of the host microprocessor (i.e., PowerPC microprocessor), there are no instructions to move values directly from a general register to a floating-point register. Therefore, the instruction handler must use a scratch register to construct the address of a memory buffer. The general register value is stored in memory and then a floating-point load instruction is used to get it into the floating-point register as generally shown in FIG. 12.

It is anticipated that a Ring 2 instruction can be avoided if a host processor with adequate register resources is selected. In the case of a MIPS R4400 legacy microprocessor and a PowerPC host processor, each has a 32-bit general purpose register and 32-bit floating-point registers. This forces the requirement to save the registers through memory and restore them at one or more scratch registers are required.

Ring 3 Instructions

Ring 3 instructions involve complex operations and advanced architectural features of the legacy processor that are not easily emulated using host processors or assembly language. Therefore, Ring 3 instructions are handled using a higher-order language, such as C/C++ instead. A host assembly language handler is set up for these instructions but its function is to call the higher-order language components as required.

Figure 13A:
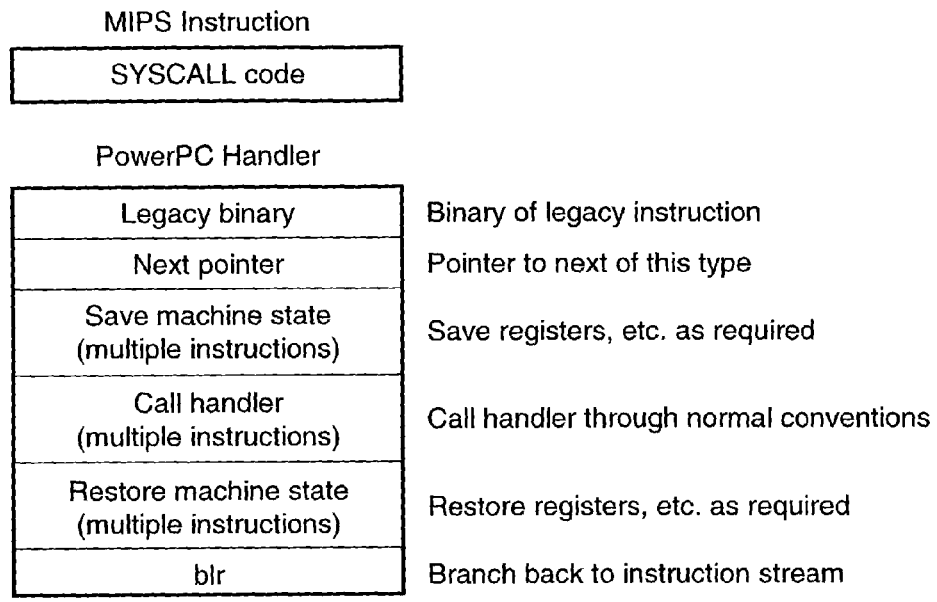
FIG. 13A is an example of an emulation of a legacy Ring 3 SYSCALL instruction that requires emulation by instruction handler, formed from higher-level instructions.

FIG. 13A illustrates a MIPS SYSCALL (system call) instruction and its host handler. As shown, the machine's state is saved prior to making the call to the higher-level language and is returned and restored on return from the handler. The requirements of calling a function in a higher-order language are well documented by the application binary interface (ABI) document of the host processor. Such ABIs contain conventions that must be followed to ensure proper interaction of programs for any given architecture. The specific requirements therefore, are dictated by the choice of the host processor. The handler for the Ring 3 instruction, then, is whatever code is necessary to call the higher-order language component.

Figure 13B:
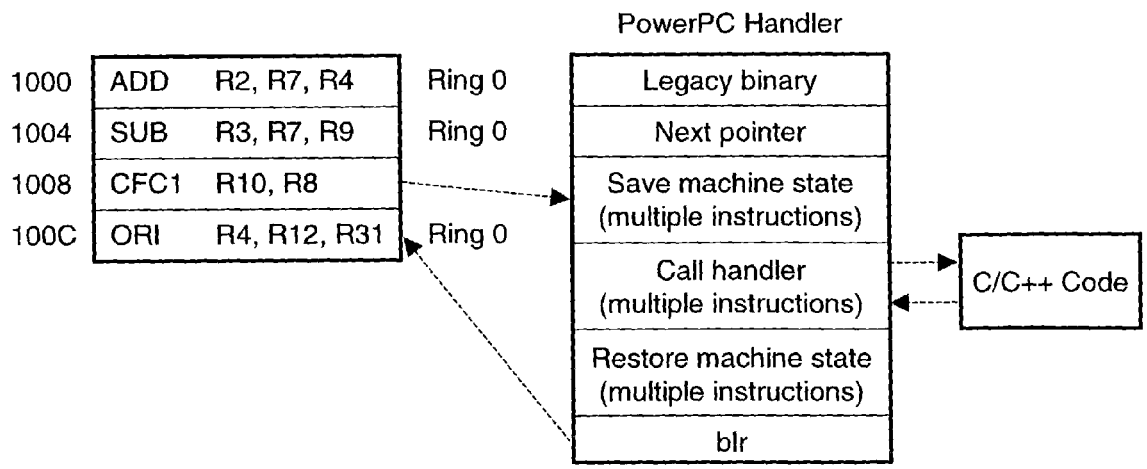
FIG. 13B is similar to FIG. 13A but for a Ring 3 CFCz legacy instruction.

FIG. 13B illustrates exemplary PowerPC assembly language and an exemplary handler for a Ring 3 CFCz instruction. The instruction handler is generated in PowerPC machine code. However, commented assembly is used for purposes of illustration.

The legacy instruction being emulated is a CFCZ instruction, which moves a 32-bit value from a legacy coprocessor register to a general-purpose register. The legacy microprocessor, in this case a MIPS RISC R4400 microprocessor, allows for up to 4 coprocessors with coprocessor 1 being the floating-point unit. The instruction handler saves out the machine state, fetches the legacy instruction from the top of the handler and then extracts the three arguments consisting of the coprocessor register number, the general-purpose register number, and the coprocessor number.

```
// Save the machine state. Registers get saved on the stack.
stwu    sp,-160(sp)     // adjust the stack pointer
mflr    r0              // get current link register
stw     r0,4(sp)        // save it on the stack
stw     r0,32(sp)       // save all PowerPC general registers to the stack
stw     r1,36(sp)       // starting at offset 32
...
stw     r30,152(sp)
stw     r31,156(sp)
// Setup to call the C/C++ handler code. For CFCz, this involves fetching
// the legacy instruction from the top of the handler (second word, just
// before any executable code) and extracting the arguments from it.
// fetch the legacy instruction from the top of the handler so the arguments
```

-continued

```
// can be retrieved
b1         +4                 // do a linking branch to get the program counter
nop                           // into the link register (can't read it directly)
mflr       r13                // fetch the program counter from the link register
lwz        r13,−152(r13)      // load the legacy CFCz instruction
// get the first argument-the contents of MIPS register rd
rlwinm     r14,r13,23,25,29   // extract the rd field and multiply by 2
addi       r14,r14,32         // form offset into stack for rd
lwzx       r3,r14,sp          // load the contents of rd from the stack
// get the second argument-the z field
rlwinm     r4,r13,5,30,31     // extract the coprocessor number (0–3)
// Call the handler function. The rest will be handled in C/C++ code.
b1         Execute_CFCz       // Execute_CFCz called as if it were a C function
// the return value comes back in r3-store it into the appropriate
// register on the stack-in the next stage it will be placed into the
// appropriate register
rlwinm     r15,r13,18,25,29   // extract the rt field from the legacy instruction
addi       r15,r15,32         // form offset into stack for rd
stwx       r3,r15,sp          // store return value into appropriate register
// Restore the machine state. Here all of the non-volatile registers are
// reloaded and the stack pointer is adjusted back.
lwz        r0,32(sp)          // restore non-volatile registers
lwz        r1,36(sp)
...
lwz        r30,152(sp)
lwz        r31,156(sp)
lwz        r0,4(sp)           // load the original link register
mtlr       r0                 // and restore it
addi       sp,sp,160          // restore the original stack pointer
blr                           // return to the instruction stream
```

In the set up section, the arguments are placed into the host, i.e. PowerPC, registers r3 and r4. This complies with the PowerPC application binary interface specification for calling a C function. The call to Execute_CFCz, is a designated C function, used for handling the CFCz instruction. An example for that function follows.

```
#include <CoprocessorControlManager.h>
// there is a pointer to the C++ class that manages the interaction with
// up to 4 MIPS coprocessors
extern CoprocessorControlManager *cp;
// we must give this function C style language naming so that it can be
// called from assembly/machine language code
extern "C"
{
unsigned long Execute_CFC (unsigned long rd, unsigned long z);
};
// this C function calls the C++ object that manages coprocessor
// operations; for the CTCz instruction, only a register read or write
// is required but the consequences of a read or write are dependent on
// the nature of the coprocessor
unsigned long Execute_CFC    (unsigned long rd, // passed in PowerPC register r3
                              unsigned long z)  // passed in PowerPC register r4
{
return cp->readReg (z, rd);
}
```

The following is an exemplary class specification for a C++ class that handles coprocessor operations.

```
// this is an example class specification for a coprocessor control object
class CoprocessorControlManager
{
public:
    // the public constructor initializes the object as necessary
    CoprocessorControlManager ( );
```

-continued

```
    // the destructor performs cleanup when the class is destroyed
    ~CoprocessorControlManager ( );
```

-continued

```
    // this function reads a coprocessor register and returns it value
    void readReg (unsigned long z, unsigned long rd);
};
```

The following is an exemplary implementation for the coprocessor read register function defined in the class above.

```
// this is an exemplary implementation of the method responsible for
// performing reads from coprocessor control resgisters
unsigned long CoprocessorControlManager ::readReg (unsigned long z,
unsigned long rd)
{
    // which coprocessor?
    switch (z)
    {
        // the floating point unit
        case 0:
        {
            // which register to read
            switch rd:
                // this is the coprocessor implementation and revision register which
                // contains information about the floating point unit (it is read only)
                case 0:
                    // return the version number
                    return 1;
                // this is the floating point control and status register
                case 1:
                    // rounding, trap enables, and flags are stored here
                    // CODE OMITTED
                    break;
            // all other regisers are reserved for this coprocessor so just
            // return 0;
            default:
                    return 0;
        } // end case
        // no other cases handled by default
        default:
                return 0;
    } // end switch
    // CODE OMITTED
}
```

Look-Up Tables

As mentioned above, Tables 1 and 2 represent the look-up tables used by the crack map object 32 for identifying legacy instructions and identifying the specific ring category for each of the legacy instructions for legacy instruction of a MIPS R4400 RISC legacy microprocessor.

TABLE 1

CLASSIFICATION OF MIPS 32 BIT INTEGER INSTRUCTIONS

| Instruction | Opcode | Function | Type | Ring | RS | RT | RD | Immediate | Shamt |
|---|---|---|---|---|---|---|---|---|---|
| ADD | 0 | 32 | R | 1 | | | | | 0 |
| ADDI | 8 | | I | 0 | | | | | |
| ADDIU | 9 | | I | 0 | | | | | |
| ADDU | 0 | 33 | R | 0 | | | | | 0 |
| AND | 0 | 36 | R | 0 | | | | | 0 |
| ANDI | 12 | | I | 0 | | | | | |
| BC0F | 16 | | I | 3 | 8 | 0 | | | |
| BC0FL | 16 | | I | 3 | 8 | 2 | | | |
| BC0T | 16 | | I | 3 | 8 | 1 | | | |
| BC0TL | 16 | | I | 3 | 8 | 3 | | | |
| BC1F | 17 | | I | 3 | 8 | 0 | | | |
| BC1FL | 17 | | I | 3 | 8 | 2 | | | |
| BC1T | 17 | | I | 3 | 8 | 1 | | | |
| BC1TL | 17 | | I | 3 | 8 | 3 | | 0 | |
| BC2F | 18 | | I | 3 | 8 | 0 | | | |
| BC2FL | 18 | | I | 3 | 8 | 2 | | | |
| BC2T | 18 | | I | 3 | 8 | 1 | | 0 | |
| BC2TL | 18 | | I | 3 | 8 | 3 | | | |
| BEQ | 8 | | I | 2 | | | | | |
| BEQL | 20 | | I | 2 | | | | | |
| BGEZ | 1 | | I | 2 | | 1 | | | |
| BGEZAL | 1 | | I | 2 | | 17 | | | |
| BGEZALL | 1 | | I | 2 | | 19 | | | |
| BGEZL | 1 | | I | 2 | | 3 | | | |
| BGTZ | 7 | | I | 2 | | 0 | | | |
| BGTZL | 23 | | I | 2 | | 0 | | | |
| BLEZ | 6 | | I | 2 | 0 | | | | |
| BLEZL | 22 | | I | 2 | 0 | | | | |
| BLTZ | 1 | | I | 2 | 0 | | | | |

TABLE 1-continued

CLASSIFICATION OF MIPS 32 BIT INTEGER INSTRUCTIONS

| Instruction | Opcode | Function | Type | Ring | RS | RT | RD | Immediate | Shamt |
|---|---|---|---|---|---|---|---|---|---|
| BLTZAL | 1 | | I | 2 | | 16 | | | |
| BLTZALL | 1 | | I | 2 | | 18 | | | |
| BLTZL | 1 | | I | 2 | | 2 | | | |
| BNE | 5 | | I | 2 | | | | | |
| BNEL | 21 | | I | 2 | | | | | |
| BREAK | 0 | 13 | I | 0 | | | | | |
| CACHE | 47 | | I | 3 | | | | | |
| CFC0 | 16 | 0 | R | 0 | 2 | | | | 0 |
| CFC1 | 17 | 0 | R | 3 | 2 | | | | 0 |
| CFC2 | 18 | 0 | R | 3 | 2 | | | | 0 |
| COP0 | 16 | | J | 3 | | | | upper bit set | 0 |
| COP1 | 17 | | J | 3 | | | | upper bit set | 0 |
| COP2 | 18 | | J | 3 | | | | upper bit set | |
| CTC0 | 16 | 0 | R | 0 | 6 | | | | 0 |
| CTC1 | 17 | 0 | R | 3 | 6 | | | | |
| CTC2 | 18 | 0 | R | 3 | 6 | | | | 0 |
| CTC3 | 19 | 0 | R | 3 | 6 | | | | |
| DIV | 0 | 26 | R | 2 | | | 0 | | 0 |
| DIVU | 0 | 27 | R | 2 | | | 0 | | 0 |
| ERET | 16 | 24 | R | 3 | 16 | 0 | 0 | | 0 |
| J | 2 | | J | 0 | | | | | |
| JAL | 3 | | J | 2 | | | | | |
| JALR | 0 | 9 | R | 2 | | 0 | | | 0 |
| JR | 0 | 8 | R | 1 | | 0 | 0 | | 0 |
| LB | 32 | | I | 0 | base | | | offset | |
| LBU | 36 | | I | 0 | base | | | offset | |
| LH | 33 | | I | 0 | base | | | offset | |
| LHU | 37 | | I | 0 | base | | | offset | |
| LL | 48 | | I | 3 | base | | | offset | |
| LUI | 15 | | I | 0 | 0 | | | | |
| LW | 35 | | I | 0 | base | | | offset | |
| LWC1 | 49 | | I | 3 | base | | | offset | |
| LWC2 | 50 | | I | 3 | base | | | offset | |
| LWL | 34 | | I | 0 | base | | | offset | |
| LWR | 38 | | I | 0 | base | | | offset | |
| LWU | 39 | | I | 0 | base | | | offset | |
| MFC1 | 17 | 0 | R | 3 | 0 | | | | |
| MFC2 | 18 | 0 | R | 3 | 0 | | | | |
| MFHI | 0 | 16 | R | 1 | 0 | 0 | | | 0 |
| MFLO | 0 | 18 | R | 1 | 0 | 0 | | | |
| MTC1 | 17 | 0 | R | 3 | 4 | | | | |
| MTC2 | 18 | 0 | R | 3 | 4 | | | | |
| MTHI | 0 | 17 | R | 2 | | 0 | 0 | | 0 |
| MTLO | 0 | 19 | R | 2 | | 0 | 0 | | 0 |
| MULT | 0 | 24 | R | 2 | | | 0 | | 0 |
| MULTU | 0 | 25 | R | 3 | | | 0 | | 0 |
| NOR | 0 | 39 | R | 0 | | | | | 0 |
| OR | 0 | 37 | R | 0 | | | | | 0 |
| ORI | 13 | | I | 0 | | | | | |
| SB | 40 | | I | 0 | | | | | |
| SC | 56 | | I | 3 | base | | | offset | |
| SH | 41 | | I | 0 | base | | | offset | |
| SLL | 0 | 0 | R | 0 | 0 | | | | |
| SLLV | 0 | 4 | R | 0 | | | | | 0 |
| SLT | 0 | 42 | R | 2 | | | | | 0 |
| SLTI | 10 | | I | 2 | | | | | |
| SLTIU | 11 | | I | 2 | | | | | |
| SLTU | 0 | 43 | R | 2 | | | | | 0 |
| SRA | 0 | 3 | R | 0 | 0 | | | | |
| SRAV | 0 | 7 | R | 0 | | | | | 0 |
| SRL | 0 | 2 | R | 0 | 0 | | | | |
| SRLV | 0 | 6 | R | 0 | | | | | 0 |
| SUB | 0 | 34 | R | 1 | | | | | 0 |
| SUBU | 0 | 35 | R | 0 | | | | | 0 |
| SW | 43 | | I | 0 | base | | | offset | |
| SWC1 | 57 | | I | 3 | base | | | offset | |
| SWC2 | 58 | | I | 3 | base | | | offset | |
| SWL | 42 | | I | 0 | base | | | offset | |
| SWR | 46 | | I | 0 | base | | | offset | |
| SYNC | 0 | 15 | R | 0 | 0 | 0 | 0 | | 0 |
| SYSCALL | 0 | 12 | R | 3 | code | code | code | code | |
| TEQ | 0 | 52 | R | 3 | | | code | code | |
| TEQI | 1 | | I | 3 | | 12 | | | |
| TGE | 0 | 48 | R | 3 | | | | | |
| TGEI | 1 | | I | 3 | | 8 | | | |

TABLE 1-continued

CLASSIFICATION OF MIPS 32 BIT INTEGER INSTRUCTIONS

| Instruction | Opcode | Function | Type | Ring | RS | RT | RD | Immediate | Shamt |
|---|---|---|---|---|---|---|---|---|---|
| TGEIU | 1 |  | I | 3 |  | 9 |  |  |  |
| TGEU | 0 | 49 | R | 3 |  |  | code | code |  |
| TLBP | 16 | 8 | R | 3 | 16 | 0 | 0 |  | 0 |
| TLBR | 16 | 1 | R | 3 | 16 | 0 | 0 |  | 0 |
| TLBWI | 16 | 2 | R | 3 | 16 | 0 | 0 |  | 0 |
| TLBWR | 16 | 6 | R | 3 | 16 | 0 | 0 |  | 0 |
| TLT | 0 | 50 | R | 3 |  |  | code | code |  |
| TLTI | 1 |  | I | 3 |  | 10 |  |  |  |
| TLTIU | 1 |  | I | 3 |  | 11 |  |  |  |
| TLTU | 0 | 51 | R | 3 |  |  | code | code |  |
| TNE | 0 | 54 | R | 3 |  |  | code | code |  |
| TNEI | 1 |  | I | 3 |  | 14 |  |  |  |
| XOR | 0 | 38 | R | 0 |  |  |  |  | 0 |
| XORI | 14 |  | I | 0 |  |  |  |  |  |

TABLE 2

CLASSIFICATION OF MIPS 32 BIT FLOATING POINT INSTRUCTIONS

| Instruction | Opcode | Function | Type | Ring | FT/Base | FS | FD | Offset | Format |
|---|---|---|---|---|---|---|---|---|---|
| ABS.fmt | 17 | 5 | R | 0 | 0 |  |  |  |  |
| ADD.fmt | 17 | 0 | R | 0 |  |  |  |  |  |
| C.cond.fmt | 17 | FC/cond | R | 0 |  |  | 0 |  |  |
| CEIL.L.fmt | 17 | 10 | R | 2 | 0 |  |  |  |  |
| CEIL.W.fmt | 17 | 14 | R | 2 | 0 |  |  |  |  |
| CVT.D.fmt | 17 | 33 | R | 2 | 0 |  |  |  |  |
| CVT.L.fmt | 17 | 37 | R | 2 | 0 |  |  |  |  |
| CVT.S.fmt | 17 | 32 | R | 2 | 0 |  |  |  |  |
| CVT.W.fmt | 17 | 36 | R | 2 | 0 |  |  |  |  |
| DIV.fmt | 17 | 3 | R | 0 |  |  |  |  |  |
| DMFC1 | 17 | 0 | R | 3 |  |  | 0 |  | 1 |
| FLOOR.L.fmt | 17 | 11 | R | 2 | 0 |  |  |  |  |
| FLOOR.W.fmt | 17 | 15 | R | 2 | 0 |  |  |  |  |
| MOV.fmt | 17 | 6 | R | 0 | 0 |  |  |  |  |
| MUL.fmt | 17 | 2 | R | 0 |  |  |  |  |  |
| NEG.fmt | 17 | 7 | R | 0 | 0 |  |  |  |  |
| ROUND.L.fmt | 17 | 8 | R | 0 | 0 |  |  |  |  |
| ROUND.W.fmt | 17 | 12 | R | 0 | 0 |  |  |  |  |
| SQRT.fmt | 17 | 4 | R | 2 | 0 |  |  |  |  |
| TRUNC.L.fmt | 17 | 9 | R | 0 | 0 |  |  |  |  |
| TRUNC.W.fmt | 17 | 13 | R | 0 | 0 |  |  |  |  |

As shown, Table 1 includes an exemplary ten fields. The first field is identified as an instruction field and identifies the assembly language "mnemonic" for each of the legacy instructions. The op-code field represents the op-code of the legacy instruction. The function field is used for register type instructions for both integer instruction format and a floating point instruction format instructions. For example, FIGS. 16–20 illustrate the integer and floating point binary instruction formats for a MIPS microprocessor. For register type instructions, the function field is used as a sub-op code and translates to a function field for the host processor as described, for example, in connection with FIG. 4. example, bits 0 through 10 (See FIG. 4.). Thus, as shown, for the ADDU instruction, the decimal value of sub-op-code (i.e., bits 0 through 10) is 33. This value 33, in the case of the ADDU instruction is thus identified in the function field. The type field relates to the instruction type, for example, as illustrated in FIGS. 16–20. Tables 1 and 2 also include a ring field. The ring field corresponds to the Ring category as discussed above. The RS, RT and RD fields relate to the legacy registers and identify the register numbers associated with the registers rs, rt and rd. The immediate field is used for immediate type instructions, for example, as illustrated in FIG. 16. Finally, the "Shamt" field relates to the shift amount for example for legacy instructions as illustrated in FIG. 17.

Table 2 lists the 32 bit floating instructions for a MIPS R4400 RISC microprocessor. The "instruction," "op code," "function," "type" "ring" fields are the same as Table 1. The "FT/base" and "offset" fields are used for immediate type floating point instructions, for example, as shown in FIG. 19. The FT, FS and FD fields refer to register numbers for floating print instructions.

The format field indicates the size and format of the floating point value. Table 3 illustrates valid format field codes for designating single and double precision IEEE 754 floating point values as well as single and long word fixed point values. Other values of the format field are possible but used for decoding instructions only.

| Format Code (fmt Field) | Mnemonic | Size | Format |
|---|---|---|---|
| 16 | S | Single | Binary floating-point |
| 17 | D | Double | Binary floating-point |
| 18 | — | — | — |
| 19 | — | — | — |
| 20 | W | Single | 32-bit Binary Fixed-Point |
| 21 | L | Longword | 64-bit Binary Fixed-Point |
| 22–31 | — | — | — |

Obviously, many modifications and variations of the present invention are possible in light of the above teachings. Thus, it is to be understood that, within the scope of the appended claims, the invention may be practiced otherwise than as specifically described above.

The invention claimed is:

1. A method for emulating instructions of a legacy microprocessor on a host microprocessor comprising the steps of:
   (a) providing a host processor with host processor instructions;
   (b) running legacy instructions on said host processor, wherein said legacy instructions are different from said host processor instructions and said legacy processor is different from said host processor;
   (c) checking the object code of the legacy instructions and categorizing said legacy instructions as Ring 0, Ring 1, Ring 2 and Ring 3 instructions;
   (d) converting said Ring 0 instructions by directly mapping each Ring 0 instruction to a single host instruction; and
   (e) providing instruction handlers and directing said Ring 1, Ring 2 and Ring 3 instructions to said instruction handlers for further processing and replacing each legacy instruction with two or more host instructions which together perform the same function as the legacy instruction.

2. The method as recited in claim 1, further including the step of re-mapping registers associated with said legacy instructions to corresponding host registers.

3. The method as recited in claim 1, wherein step (e) includes the step of utilizing multiple host instructions which together perform the same function as a single scratch pad register but require the use of one or more scratch pad registers defining Ring 2 instructions to replace one or more of said legacy instructions.

4. The method as recited in claim 3, wherein step (e) includes the step of emulating legacy instructions which can only be emulated with a high level language defining a Ring 3 instruction.

5. The method as recited in claim 1 wherein said instruction handlers are mapped to separate address space from said Ring 0 instructions.

6. The method as recited in claim 5, wherein said emulated instructions form an instruction stream containing Ring 0 instructions and unconditional branch instructions to said instruction handlers for said Ring 1, Ring 2 and Ring 3 instructions.

* * * * *